United States Patent [19]

Tanaka

[11] Patent Number: 4,873,511

[45] Date of Patent: Oct. 10, 1989

[54] DEVICE FOR FORECASTING BREAKAGE CABLES IN AN INDUSTRIAL ROBOT

[75] Inventor: Seizo Tanaka, Aichi, Japan

[73] Assignee: Mitsubishi Denki Kabushiki Kaisha, Tokyo, Japan

[21] Appl. No.: 187,146

[22] Filed: Apr. 28, 1988

[30] Foreign Application Priority Data

Apr. 28, 1987 [JP] Japan ................................ 62-105022

[51] Int. Cl.$^4$ ........................ G08B 21/00; B25J 19/00
[52] U.S. Cl. ................................. 340/677; 200/61.18; 901/46
[58] Field of Search ............... 340/677, 508, 515, 596, 340/599; 200/61.18; 901/46

[56] References Cited

U.S. PATENT DOCUMENTS

| | | | |
|---|---|---|---|
| 4,453,159 | 6/1984 | Huff et al. | 340/596 X |
| 4,767,257 | 8/1988 | Kato | 414/744.5 |
| 4,793,203 | 12/1988 | Staggl et al. | 74/479 |
| 4,797,662 | 1/1989 | Graham et al. | 340/677 |

Primary Examiner—Glen R. Sarann, III
Assistant Examiner—Thomas Mullen, Jr.
Attorney, Agent, or Firm—Sughrue, Mion, Zinn, Macpeak & Seas

[57] ABSTRACT

An industrial robot and a device for forecasting breakage of cables, which is capable of predicting the time of breakage of cables provided between a control section and arm drive sections in the industrial robot. Sample wires whose life period is shorter than that of the cables are provided to the cables, respectively, and based on the breakage of the sample wires, the breakage of the cables is forecasted to thereby make it possible to replace the cables timely.

11 Claims, 3 Drawing Sheets

DEVICE FOR FORECASTING BREAKAGE CABLES IN AN INDUSTRIAL ROBOT

DETAILED DESCRIPTION OF THE INVENTION (1) Field of the Invention

The present invention relates to an industrial robot. More particularly, the invention relates to a device for predicting breakage of cables, which is capable of forecasting the time of breakage of cables provided between a control section and arm drive sections in the industrial robot.

(2) Description of Prior Art

A conventional device of this type will be described with reference to FIGS. 1 and 2. FIG. 1 is a schematic diagram showing a side view of an industrial robot and FIG. 2 is an explanatory diagram of wiring in the conventional industrial robot shown in FIG. 1.

The industrial robot 1 comprises a robot body 2 and an arm unit 3, the arm unit 3 being driven in accordance with command signals from a control section provided in the robot body 2. As shown in FIG. 1, the arm 3 which includes a first arm 3A and a second arm 3B, is installed extending horizontally from the upper end of the robot body 2. As the result of action of a $\theta1$ motor 4 provided in a base portion of the first arm 3A, the first arm 3A performs swing movement centering on the motor 4. A $\theta2$ motor 5 is provided in a joint portion of the first and the second arm 3B so as to perform swing movement of the second arm 3B centering on the motor 5.

An $\alpha$ motor 7 for driving a tip-end member 6 is provided at the tip-end of the second arm 3B.

The $\theta1$ motor 4, $\theta2$ motor 5 and $\alpha$ motor 7 are connected to the control section in the body 2 by their respective cables 8 and 9 that are disposed lying along the arm 3. This wiring is shown in FIG. 2 in which a relay unit 10 is provided between the robot control section and the various motors 4, 5 and 7.

With such an industrial robot as described above, repeated performance of work by the industrial robot 1 may result in fatigue of the cables 8 and 9 and subsequent breakage thereof. If such breakage occurs suddenly when it is not expected, there is a risk that it can hinder execution of desired plans, since working is stopped and replacing the cables takes time.

Even if one undertakes planned replacement of the cables 8 and 9 prior to the breakage, it is difficult to effect suitable replacement matching the life of cable since different cables have different lives.

SUMMARY OF THE INVENTION

In order to resolve the above-described problem, an object of the present invention is to provide a device for forecasting breakage of cables in an industrial robot, which is capable of forecasting the breakage of different cables independently.

The above and, other objects of the present invention are accomplished by the provision of a device for forecasting breakage of cables coupled between a control means provided to a main body of an industrial robot and a driving means for driving arms of the industrial robot, the arms being driven by an instruction signal transmitted through the cables from the control means comprising sample wires for detecting breakage of at least one of the cables, which are laid alongside the cables, respectively, the sample wires becoming fatigued and break earlier than the cables to predict the time of breakage of the cables.

BRIEF DESCRIPTION OF THE DRAWINGS

In the accompanying drawings.

DESCRIPTION OF THE PREFERRED EMBODIMENTS

Figure 1:
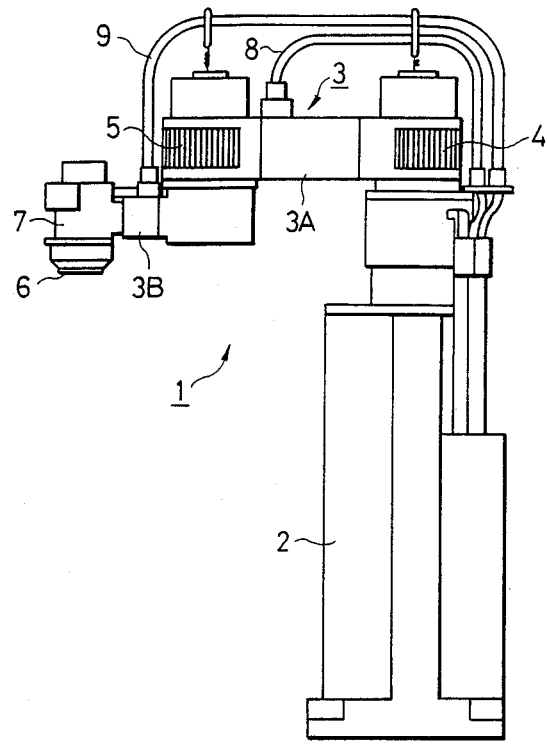
FIG. 1 is a schematic diagram showing a side view of a conventional industrial robot.
Figure 2:
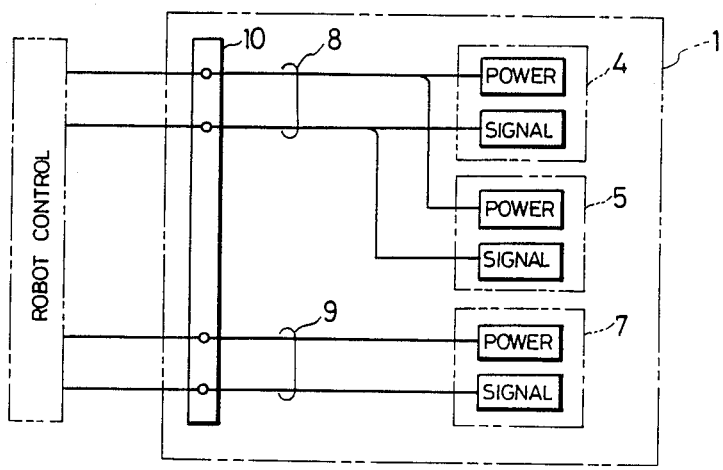
FIG. 2 is an explanatory diagram showing wiring in the industrial robot of FIG. 1.
Figure 3:
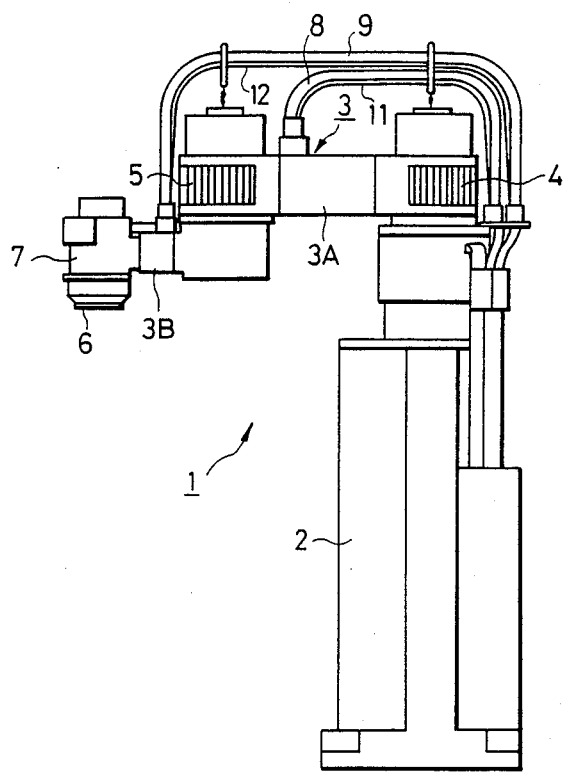
FIG. 3 is a schematic diagram showing a side view of an embodiment of an industrial robot according to the present invention.
Figure 4:
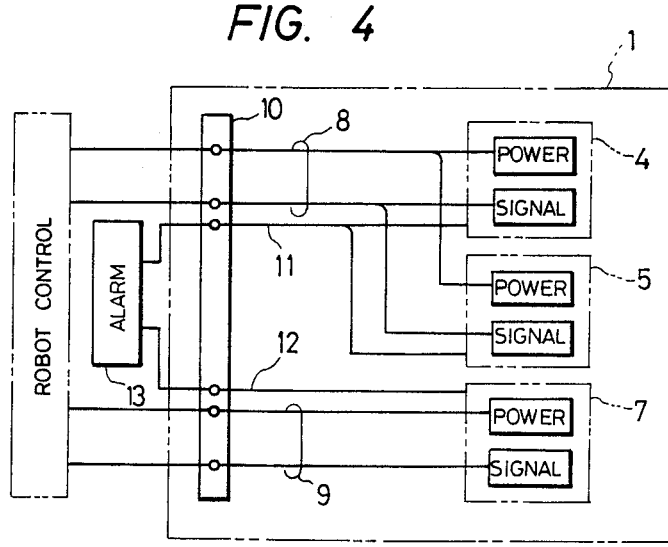
FIG. 4 is an explanatory diagram showing wiring in the embodiment of FIG. 3.

A preferred embodiment of the present invention will be described with reference to FIGS. 3 and 4. FIG. 3 is a schematic diagram showing a side view of an embodiment of an industrial robot according to the present invention and FIG. 4 is an explanatory diagram showing wiring in the embodiment of FIG. 3. In the figures, parts that are the same as those shown in FIGS. 1 and 2 bear the same reference numerals, and therefore a description thereof is omitted.

A significant feature of the device of this embodiment resides in provision of breakage detection wires 11 and 12 alongside the cables 8 and 9, as seen in the FIGS. 3 and 4, to forecast the various times of breakage of the cables 8 and 9.

The material of the breakage detection wires 11 and 12 is selected to have characteristics such that it will be fatigued earlier than the electric cable material constituting the respective cables 8 and 9 under the same condition. As can be seen from FIG. 4, the wires 11 and 12 are coupled between the motors 4, 5 and 7 and a breakage alarm unit 13 which detects an occurrence of breakage of at least one of the wires 11 and 12 to produce an alarm. As is best shown in FIG. 3, the wires 11 and 12 are laid along the outer sides of the cables 8 and 9.

Thus, on repeated execution of operations by the arm 3, the wires 11 and 12 become fatigued and eventually break at an earlier time than the electric cables constituting cables 8 and 9. The alarm unit 13 outputs an alarm signal indicative of an occurrence of the breakage. This alarm signal may be, for example, an acoustical alarm signal, a visual alarm signal, or a combination of both. The operator knows from this alarm signal that cables corresponding to the wire that has broken approaches the end of their life period and can therefore set about the task of replacing the cables within a work program. Consequently, there is no suspension of work due to sudden breakage of cables nor is there any unnecessary changing of cables.

Figure 5:
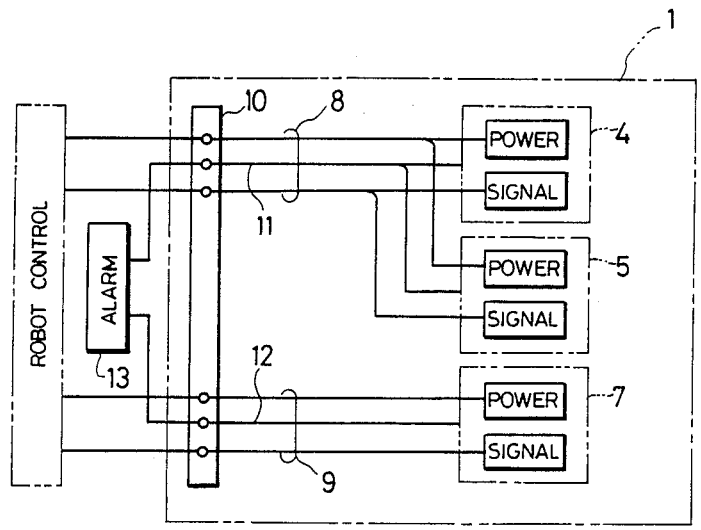
FIG. 5 is an explanatory diagram showing another example of wiring in the embodiment of FIG. 3.

FIG. 5 shows a modification of the invention. A significant feature of this modification resides in that breakage detection wires 11 and 12 are disposed at the inners sides of the cables 8 and cables 9. As a result, the wires 11 and 12 are subjected to the same conditions as the electric cables constituting cables 8 and 9, so making it possible to predict the life of cables 8 and 9 more accurately.

Since sample wires for interruption detection become fatigued and break prior to breakage of cables, the invention makes it possible to know beforehand that the time of breakage of cables is close to thereby permit replacement of fatigued cables in a planned manner.

What is claimed is:

1. A device for forecasting breakage of cables coupled between a control means provided to a main body of an industrial robot and a driving means for driving arms of said industrial robot, said arms being driven by an instruction signal transmitted through said cables from said control means, the device comprising:

at least one sample wire for forecasting breakage of at least one of said cables, said at least one sample wire being disposed next to at least one of said cables, and becoming fatigued and breaking earlier than said cables to forecast the time of breakage of said cables.

2. The device as claimed in claim 1, wherein said at least one sample wire is connected to means for producing an alarm signal in response to the detection of breakage of said at least one sample wire.

3. The device as claimed in claim 1, wherein the at least one sample wire comprises a plurality of sample wires.

4. The device as claimed in claim 3, wherein each of said sample wires is disposed next to a different one of said cables.

5. An industrial robot comprising:

a robot body including a control means;

an arm means coupled to said robot body in such a manner that said arm means can swing relative to said robot body;

an arm drive means, coupled to said arm means, for driving said arm means to carry out the swing movement;

cable means, coupled between said control means and said arm drive means, for transmitting a control signal from said control means to said arm drive means;

at least one sample wire provided along said cable means so as to move together with said cable means, said at least one sample wire becoming fatigued and breaking earlier than said cable means to forecast the time of breakage of said cable means; and means for predicting the time of breakage of said cable means, said predicting means being coupled to said at least one sample wire to detect the breakage thereof, whereby the detection of breakage of the at least one sample wire by said predicting means is used to predict the time of breakage of said cable means.

6. The robot as claimed in claim 5, wherein said means for predicting is an alarm producing device.

7. The robot as claimed in claim 6, wherein said alarm producing device produces at least one of an acoustic alarm and a visual alarm.

8. The robot as claimed in claim 5, wherein said at least one sample wire is provided outside of said cable means relative to said arm means.

9. The robot as claimed in claim 5, wherein said at least one sample wire is provided inside of said cable means relative to said arm means.

10. The industrial robot as claimed in claim 5, wherein the at least one sample wire comprises a plurality of sample wires.

11. The industrial robot as claimed in claim 10, wherein said cable means comprises a plurality of cables, and wherein each of said sample wires is disposed next to a different one of said cables.

* * * * *